United States Patent [19]

Knott et al.

[11] Patent Number: 4,645,040
[45] Date of Patent: Feb. 24, 1987

[54] ADJUSTING AND CENTERING CONTRIVANCE FOR SERVO BRAKES

[75] Inventors: Valentin Knott, Eggstätt; Hans Huber, Gollenshausen; Wolfgang Langheinrich, Eggstätt; Stephan Maier, Marquartstein, all of Fed. Rep. of Germany

[73] Assignee: Firma. Maschinenbau Knott Eggstatt Ing. Valentin Knott, Fed. Rep. of Germany

[21] Appl. No.: 577,984

[22] Filed: Feb. 8, 1984

[30] Foreign Application Priority Data

Feb. 10, 1983 [DE] Fed. Rep. of Germany ....... 3304593

[51] Int. Cl.⁴ ..................... F16D 51/00; F16D 65/38
[52] U.S. Cl. ..................... 188/79.5 GT; 188/196 BA
[58] Field of Search ................. 188/79.5 R, 79.5 GE, 188/79.5 SC, 342, 140 A, 196 B, 196 BA, 79.5 GT; 192/111 A

[56] References Cited

U.S. PATENT DOCUMENTS 3,279,565 10/1966 Cusack .................... 188/196 BA X
4,456,101 6/1984 Yamamoto et al. ......... 188/196 BA

FOREIGN PATENT DOCUMENTS 1203622 10/1965 Fed. Rep. of Germany ...... 188/196 BA
1600121 4/1970 Fed. Rep. of Germany .
7219847 5/1972 Fed. Rep. of Germany .
2301006 7/1974 Fed. Rep. of Germany ...... 188/196 BA 2099092 12/1982 United Kingdom .......... 188/79.5 R Primary Examiner—George E. A. Halvosa
Assistant Examiner—Robert J. Oberleitner
Attorney, Agent, or Firm—Orrin M. Haugen; Thomas J. Nikolai

[57] ABSTRACT

An adjusting and centering contrivance for a servo brake including a U-shaped, fixed guide casing (1) and in the axial borings of which is journaled a slide-through lock that is mounted in an axially displaceable fashion out from a central position against the force of a centering spring (15). The slide-through lock comprises two threaded bolts (3) that are screwed into an adjustment tube (5). Firmly disposed, axially symmetrical hereto is an adjustment gear (17) and which engages an adjustment lever (19). The adjustment lever (19) that is pivotable about a bolt (21) and is swivelled outwardly and brought back to its initial position by means of a separate reset (return) spring via a stop (33) during a slide-through movement of the slide-through lock. In order to obtain an adjusting and centering contrivance with increased operation safety and performance without thereby enlarging the stressed structural space, return of the pivoting lever (19) is undertaken solely by means of the centering spring (15). Additionally provided is an actuation add-on piece (37) that is capable of moving along with the slide-through lock and that cooperates with another stop (35) acting in the opposing direction on the adjustment lever (19) and, which after completing the slide-through movement when centering the slide-through lock, effects a reverse pivoting of the adjustment lever (19).

9 Claims, 6 Drawing Figures

4,645,040

ADJUSTING AND CENTERING CONTRIVANCE FOR SERVO BRAKES

BACKGROUND OF THE INVENTION

The invention concerns a centering and adjusting contrivance for servo brakes in accordance with the precharacterizing clause of claim 1.

In one known adjusting and centering contrivance from DE-GM 72 19 84, for a slide-through lock of an inner shoe servo brake, we are dealing with an adjusting contrivance that is effective solely in one direction and which additionally includes a plate-formed adjustment lever having an adjustment pawl that meshes with a single sided toothing. In operation and upon incurring a slide-through motion of the slide-through lock, the adjustment lever is swivelled outwardly about an axis of rotation provided on the guide casing such that the arresting pawl first stops over one tooth. Thereafter, and with a subsequent centering of the slide-through lock effected by spring force, a resulting circumferential return movement causes the arresting pawl to mesh with the tooth previously stopped over and rotate an adjustment sleeve in the direction of screwing out the threaded bolt. Also provided for actuating the adjustment lever is an add-on piece capable of being moved with the slide-through lock and which cooperates with a stop on the adjustment lever for the purpose of swinging out. The reverse circumferential movement of the adjustment lever is effected via a return spring that engages on the one end to a transverse arm of the adjustment lever and that is anchored at the other end to the guide casing. The adjustment lever is secured to a bolt serving as a pivoting axis by means of a bracket clamp projecting through a transverse boring through the bolt.

In spite of its operability, however, this adjusting and centering contrivance displays serious disadvantages. For one thing, it has been shown in practice and in particular in the case of commercial vehicles with relatively high braking moments and with reversing operational application, that the operational safety at this type of adjusting mechanism no longer suffices for present-day requirements. Specifically and in the case of strong vibrations, it is possible with this type of adjusting mechanism that the adjustment lever may be induced to pivot outwardly by these vibrations and, thereby, without need, engage behind the next tooth of the adjustment gear and undertake to make an adjustment.

Furthermore, the return springs are also exposed to a certain amount of wear, so that, in the case of a comprehensive and intensive stressing, their return forces change. Additionally, it is further possible that as a slide-through movement of the slide-through lock induces the adjustment lever to pivot outwardly, the adjustment gear may move and follow along, so that meshing behind a next tooth is suppressed, thereby preventing the accomplishment of the desired adjustment. These disadvantageous actions occur in particular in the case of heavy commercial vehicles with a great amount of wear, and with strong impairment from dirt on the adjusting contrivance. Ultimately and finally, in the case of the previously known adjusting contrivance, the structural space that is stressed by the upwardly laterally extending lever arm, to which the return spring is attached, is relatively great.

SUMMARY OF THE INVENTION

Accordingly, the task for the invention is to overcome these disadvantages and to obtain an adjusting and centering contrivance based on the state of the art, with increased operational safety and performance and without thereby increasing the stressed structural space.

The task is resolved in accordance with the invention in correspondence with the features given in the characterizing part of the appended claims. Further advantageous embodiments within the idea of the task set forth are given in the subclaims.

In the case of an adjusting and centering contrivance for servo brakes in accordance with the invention, there is, first of all, no longer any return spring required for the adjustment lever. In accordance with the invention, the return of the adjustment lever is taken over by the centering spring. Additionally, the slide-through lock displays a carried-along return add-on piece that cooperates with a second stop lying along the path of travel of the adjustment lever, in the opposing direction to the first stop, and, which in the case of a reverse centering of the slide-through lock, guides the adjustment lever back to its initial position. Because of this arrangement, not only is the return spring as such advantageously superfluous, but much more to the point is that the adjustment lever itself is maintained in this initial position so that an outward pivoting becomes impossible.

Moreover, by means of the present invention, also in advantageous fashion, the required structural space is reduced through elimination of an additional return spring.

The operational safety and performance are increased by the fact that there is provided an arresting bracket anchored in the guide casing that is held in place in meshing fashion by its end between two adjacent teeth of the arresting toothing of the adjustment gear. Thus, in the case of an initial outward swivelling of the adjustment lever, the adjustment gear will not be carried along but rather will be held fast, so that, then, when reaching a certain length of stroke of the adjustment lever, a positive back-engagement of a next tooth and further adjustment is possible.

The contrivance in accordance with the invention is embodied such that an adjustment in both slide-through directions of the slide-through lock becomes possible. Indeed, a previously known contrivance DE-OS 31 12 550 is a double-acting adjusting and centering contrivance for an inner shoe servo brake. This latter contrivance, however, like the previously mentioned contrivance is provided with a separate return spring for bringing back the adjustment lever, and thus displays the disadvantages cited previously.

A provision is made so that the adjustment add-on piece for outward pivoting that is moved along with the slide-through lock against the force of the centering spring and the return add-on piece for bringing back the adjustment lever are constructed as a common part, whereby, this common actuating add-on piece engages in a corresponding cutout in the adjustment lever, through which the two oppositely lying stops are formed for controlling the outward pivoting and return of the adjustment lever.

An additional elastic springiness is advantageously provided and with which the adjustment lever is pressed in the direction toward the associated adjustment gear. In this fashion, even in the case of enormous loadings and oscillations, operational safety is further increased.

A further improvement is achieved via the fact that the adjustment pawl forming the forward part of the adjustment lever is angled relative thereto such that this latter (pawl) engages one arresting tooth deeper.

A better meshing of the adjustment pawl with the adjustment gear is, finally, also enabled by structuring the adjustment pawl offset to the adjustment lever and by having the adjustment gear display a diameter corresponding essentially to that of the width of the guide casing. Through means of these smaller dimensions, not only is a lesser structural space stressed, but also and above all, is the meshing relationship between the adjustment pawl and the adjustment gear improved.

Further advantages, particulars and features of the invention are described in the following description with the aid of the examples of the various embodiments, along with reference to the accompanying figures.

DESCRIPTION OF THE PREFERRED EMBODIMENT

Figure 1:
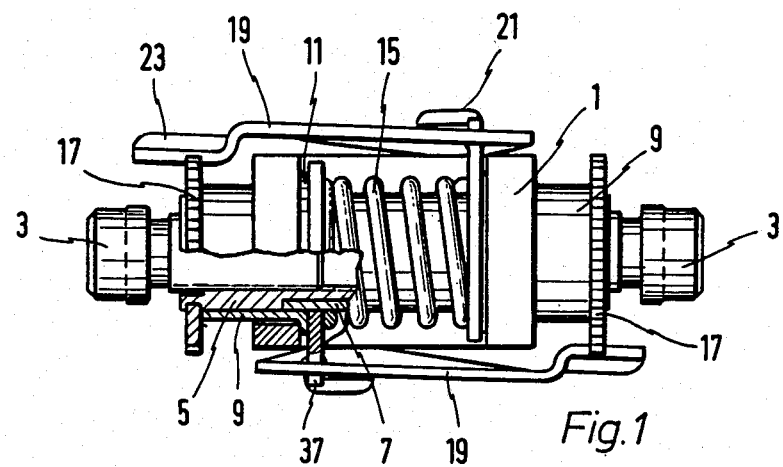
FIG. 1 is a top view in a partially cut representation of an adjusting and centering contrivance in accordance with the invention.

In the following, reference will be made to FIGS. 1 to 4 and wherein a self-actuated adjusting and centering contrivance is shown for a servo brake having a guide casing 1, essentially U-shaped in the side view, and which in a manner not shown in more detail, is capable of being firmly joined with the brake base plate and/or the brake carrier. Arranged in the guide casing 1, in borings, is a slide-through lock that is displaceable in its axial direction and which transfers the braking actuating force from the primary shoe to the secondary shoe. This slide-through lock also serves as an adjusting and centering contrivance and increases its axial length with wear of the brake lining, on one or both of the brake shoes relative to a centered unworn position, and, thereby maintains constant the brake air gap for each one of the two brake shoes.

Located on the ends of the brake shoes, in turn, is a threaded bolt 3 that is screwed into an adjustment tube 5, associated with one or the other brake shoe. The adjustment tubes 5 are staged at their oppositely lying front sides and are joined with one another via a front side abutting connection tube 7. Further, the adjustment tubes 5 are each rotatably journaled in a jacket 9 that surrounds them and are arranged in a longitudinally displaceable fashion in the borings in the U-shaped guide casing 1, with each one displaying a flange 11 on its front side that is turned toward the other. Provided in adjoining fashion to the flanges 11 in each case is an adjustment disk 13, so that a strong centering spring 15, located between the adjustment disks 13, can be spaced over the adjustment disks 13, the flanges 11, the jacket 9 and, with their flanges, are held in contact against the arms of the U-shaped guide casing.

Further, each adjustment tube 5 is firmly joined with an adjustment gear 17 arranged axially symmetric thereto. The alignment of an arresting toothing on the adjustment gear 17 depends upon the thread direction between the adjustment tube 5 and the threaded bolt 3 and is selected such that rotation typically leads to screwing out the threaded bolt 3, if the adjustment gear 17 is carried along when a pawl engages.

Even if, in the example of the embodiment shown, the two adjustment tubes 5 with the adjustment gears 17 arranged thereon can be drawn down slightly axially, the braking forces introduced on a threaded bolt 3 also effect a slide-through of the slide-through lock because of the front side contact between the first adjustment tube 5, the connecting tube 7 and the second adjustment tube 5.

Figure 2:
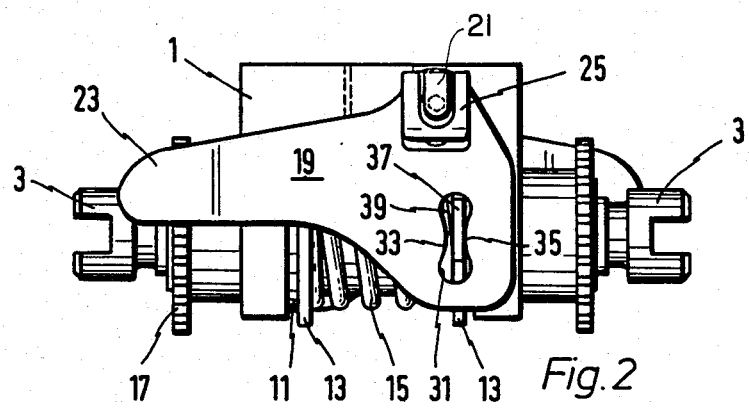
FIG. 2 is a side view in accordance with FIG. 1.

With particular attention directed to FIGS. 1 and 2, also provided are two adjustment levers 19, lying on opposite sides and rotated 180° to one another, and both of which are pivotable about a bolt 21 fixed to the guide casing 1. As is to be seen in particular from FIG. 2, the bolts 21 serve as axes of rotation and are arranged offset to the longitudinal axis of the slide-through lock. Each adjustment lever 19 contains at its forward end, an adjustment pawl 23 that meshes in the associated adjustment gear 17, said pawl being offset to the adjustment lever 19 itself and at an angle to its plane and being structured such that the forward engaging pawl edge can mesh deeper between two adjacent teeth of the adjustment gear 17 (FIG. 3).

Figure 3:
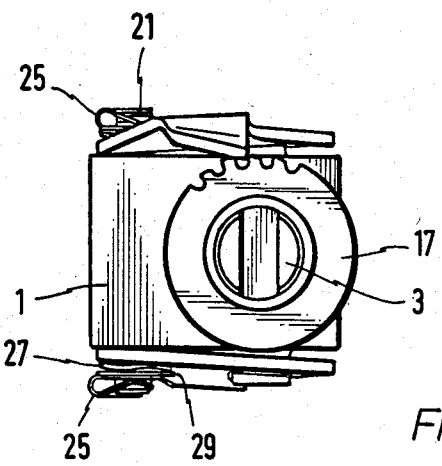
FIG. 3 is a front view in accordance with FIG. 1.

With further attention to FIG. 3, positive engagement of any one adjustment pawl 23 is also enabled by means of the bolt locking means 25 and its underlying spring washer 27, that is arranged to permit yet another backing washer 29 to be provided therebetween. By means of the spring washer 27, and which is structured in the form of a plate spring and mounted on the bolt securing means 25, still greater axial forces can be introduced on the adjustment lever 19 so that it will be held with its adjustment pawl 23 in yet more solid and more positive engagement with the associated adjustment gear 17.

Figure 4:
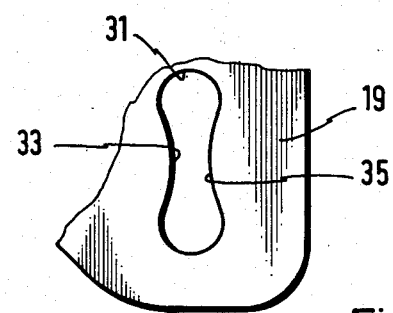
FIG. 4 is an enlarged section in accordance with FIG. 2.

As is seen in particular from FIG. 2 and also from FIG. 4, provided in each adjustment lever 19 is a cutout 31 with oppositely lying stops 33 and 35 projecting therein in the axial direction. The stops 33 and 35 are both structured convex. Further projecting through the cutout 31 is an actuating add-on piece 37 that in the embodiment shown forms a part of the adjustment disk 13.

The method of functioning of this self-actuated adjusting and centering contrivance will now be explained in the following.

If, for example, appropriate forces are introduced to the right hand threaded bolt 3 through the brake shoes, the slide-through lock will then be displaced, in its entirety, from right to left in the guide casing 1. In so doing, the strong centering spring 15 will be pressed together further by means of the right hand adjustment tube 5 and the right hand adjustment disks 13 that are carried along. In so doing and after overcoming an air gap 39, the actuating add-on piece 37 contacts the first stop 33 and thereby leads to a certain amount of swivelling, in the clockwise direction, of the adjustment lever 19 shown in FIG. 2.

Since the amount of swivelling grows with increasing wear of the lining, adjustment pawl 23 will stop over a next tooth of the adjustment gear 17 and snap in, whereby the snap-in movement is favored by the adjustment pawl 23, due to its offset structure and which angles toward the adjustment gear 17, as well as by the transverse forces on the adjustment lever 19 that are introduced to the bolt 21 through the spring washer 27.

With the subsequent resetting of the brakes, the slide-through lock is again displaced toward the right, into its initial position, by means of the strong centering spring 15. In so doing, after again overcoming the air gap 39, the add-on actuating piece 37, with the adjustment disk 13 moved toward the right, will come into contact with the second stop 35 and, therewith, swivel back the adjustment lever 19 in the counterclockwise direction simultaneously, with the force of the centering spring, into its initial position. By means of the adjustment pawl 23 that has snapped in on a next tooth, this adjustment gear 17, and therewith the associated adjustment tube 5, will be rotated such that the left hand threaded bolt 3 illustrated in the drawing will be screwed out.

As is seen in the representation shown in FIG. 2, the air gap 39 is held so small in the cutout 31 that, even in the case of strongest oscillations, the adjustment lever 19 cannot be swivelled in the clockwise direction, but will, rather, be held against the second stop 35 by the added-on actuation piece 37 acted upon with the spring force of the centering spring 15.

A corresponding displacement of the slide-through lock in the opposite direction effects a corresponding swivelling of the oppositely lying jacket and, finally, an axial lengthening of the oppositely lying threaded bolt 3.

Figure 5:
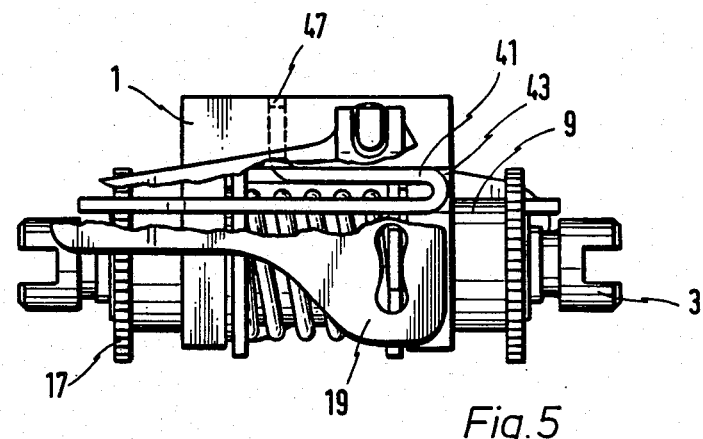
FIG. 5 is a side view of another embodiment of the adjusting and centering contrivance in accordance with the invention.
Figure 6:
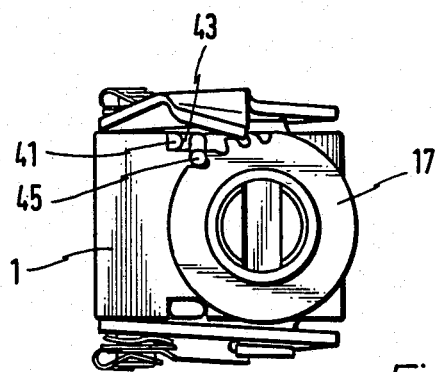
FIG. 6 is a front view in accordance with FIG. 5.

Referring now to FIGS. 5 and 6, yet another form of embodiment is shown. As can be seen in particular from FIG. 5, an arresting bracket 41 is provided and which is anchored and held on the guide casing 1. Specifically, it displays an essentially U-shape and is held in lateral cutouts 43 in the guide casing 1. At the one lateral cutout 43 on one arm of the U-shaped guide casing 1, the arresting bracket 41, with its end offset to the associated adjustment gear 17, projects thereover and is held in meshing (snap-in) fashion between two adjacent teeth. At the same time, the other end of the arresting bracket 41 is held in a transverse boring 47 in the guide casing 1 and is biased in the direction toward the adjustment gear 17.

In operation and with the slide-through of the slide-through lock and a corresponding swinging out of the adjustment lever 19, the arresting bracket 41 causes the adjustment gear 17 to be held fast and, thereby, not carried along, in order to enable a completely functional adjustment. After back-engagement of the adjustment pawl 23 and return of the adjustment lever 19 into its initial position, the offset end 45, with the thereby effected rotation of the adjustment gear 17, is lifted out of the particular tooth position and again snapped in, automatically, behind a next tooth.

While the present invention has been described with respect to two preferred embodiments, it is to be recognized that still other embodiments might be suggested to those of skill in the art. Accordingly, it is contemplated that the following claims shall be interpreted to include all equivalent embodiments.

What is claimed is:

1. In an improved adjusting and centering contrivance for a servo brake, wherein said servo brake includes:
  (a) fixed guide bushing having an essentially U-shaped profile;
  (b) a slide-through lock mounted in axial borings formed in said guide bushing and arranged for axially outwardly displaceable motion from a central position against the force of a centering spring, said slide-through lock including,
    (1) a pair of bolts threadedly engaging a first adjustment tube and with said first adjustment tube being firmly joined to an adjustment gear having an arresting toothing arranged on one side thereof and in axially symmetric disposition,
    (2) an adjustment pawl engaging and arranged to circumferentially move said adjustment gear with a slide-through movement of said slide-through lock, such that in the case of an extreme movement in the direction toward an associated brake shoe said pawl executes an outwardly pivotal movement and stops over a certain tooth and with a subsequent movement of the slide-through lock in the reverse direction said pawl executes a return circumferential movement and engages the tooth previously stopped over, thereby rotating said pawl in the direction of screwing out one of said adjustment tube engaging bolts, said adjustment pawl also being seated on an adjustment lever that is maintained for pivotal rotation about a bolt arranged on the guide casing of a fixed brake part, said adjustment pawl having a laterally offset disposed first stop disposed in the path of movement of an outwardly movable actuation add-on piece that is moved along with the slide-through lock and which add-on piece effects outward pivotal motion of the adjustment lever, the improvement comprising:
    (i) said centering spring being mounted so as to serve as a return spring for said adjustment lever;
    (ii) the said movable add-on piece being outwardly projecting and having first and second opposed side surfaces, said movable add-on piece being positionably mounted so as to be movable with said slide-through lock and with said first side surface being arranged to engage said laterally disposed first stop, and to operate with said first stop when moved in a first lineal direction toward said first stop surface in a first stage of adjustment and with said second side surface being arranged to engage said laterally disposed second stop surface and to operate with said second stop when moved in a direction opposed to said first lineal direction and toward said second stop in a second stage of adjustment, such that upon completion of a slide-through movement when centering the slide-through lock, the second side surface of said add-on piece effects a pivotal motion of the adjustment lever for the return thereof to its initial position as said add-on piece is moved along with said slide-through lock.

2. An improved adjusting and centering contrivance in accordance with claim 1 being characterized in that said slide-through lock is arranged to act in both of the opposed slide-through directions and additionally includes a second adjustment tube positioned on the front side thereof with an intermediately arranged connecting tube, whereby each of said adjustment tubes has an adjustment gear in rotation-fast engagement therewith, and with each of said adjustment gears engaging an adjustment lever, each adjustment lever having said two opposed stop surfaces for engagement with respective first and second side surfaces of its associated add-on piece, and with said stop surfaces being positioned so as to be capable of alternate engagement with its associated add-on piece each of which is movable along said first and second opposed lineal directions with said slide-through lock.

3. An improved adjusting and centering contrivance in accordance with claim 2 being characterized in that each of said actuation add-on pieces serves as an outwardly extending add-on piece capable of forward and reverse lineal movement as said first and second side surfaces engage between the associated first and second stops of the adjustment lever.

4. An improved adjusting and centering contrivance in accordance with claim 3 being further characterized in that a cutout is formed in the adjustment lever and which provides said first and second generally similar opposed stop surfaces, each of said stop surfaces being of a convex configuration and lying in a plane transverse to the first and second side surfaces of said movable actuation add-on piece and said first stop surface being arranged for outward lineal movement with said actuation add-on piece as it moves in one direction along with the slide-through lock, said second stop surface being spaced from said first stop surface such that the distance therebetween is substantially equal to the cross-sectional thickness of said actuation add-on piece plus an air gap and wherein said second stop surface is arranged to engage the second side surface of said actuation add-on piece and reverse the direction of motion thereof.

5. An improved adjusting and centering contrivance in accordance with claim 2 and having an opening formed in the adjustment lever and with said opening defining said first and second stop surfaces, said stop surfaces having a convex configuration and projecting transversely to the side surfaces of said add-on piece for outward lineal movement thereof along with the slide-through lock, and being further characterized in that said first and second stop surfaces project arcuately inwardly into said opening such that the distance between said stop surfaces is substantially equal to the thickness of said movable add-on piece plus an air gap zone.

6. An improved adjusting and centering contrivance in accordance with claim 1 being characterized in that there is mounted on the bolt forming the axis of rotation of the adjustment lever, a bolt securing means and a spring washer being supported on said bolt securing means and being positioned to act on said adjustment lever.

7. An improved adjusting and centering contrivance in accordance with claim 1 being characterized in that said adjustment pawl is disposed at a right angular direction relative to said adjustment lever and with its engaging edge being directed toward said adjustment gear.

8. An improved adjusting and centering contrivance in accordance with claim 7 being characterized in that the diameter of the adjustment gear is substantially equal to the width of the guide casing and with the adjustment pawl being offset relative to the adjustment lever.

9. An improved adjusting and centering contrivance in accordance with claim 1 being characterized in that said slide-through lock acts in both axial directions and additionally includes two adjustment tubes secured on the opposed ends thereof and including an intermediately arranged connecting tube with each adjustment tube having an adjustment gear in rotation-fast relationship therewith and with each adjustment gear engaging its respective associated adjustment lever with a pair of opposed stop surfaces being formed therein, said stop surfaces being arranged for alternative engagement with said first and second side surfaces of said outwardly projecting add-on piece that is mounted for movement along with said slide-through lock.

* * * * *